United States Patent [19]

Bush

[11] Patent Number: 5,707,238

[45] Date of Patent: Jan. 13, 1998

[54] NUMBER AND MATH EDUCATION SYSTEM

[76] Inventor: Deborah L. Bush, 1151 Sea Village Dr., Cardiff, Calif. 92007

[21] Appl. No.: 548,530

[22] Filed: Oct. 26, 1995

[51] Int. Cl.[6] .................................................. G09B 1/08
[52] U.S. Cl. .................................. 434/190; 434/330
[58] Field of Search .......................... 434/188, 191, 434/190, 205, 210, 430, 330

[56] References Cited

U.S. PATENT DOCUMENTS 3,662,477  5/1972  Weinstein ........................ 434/330

*Primary Examiner*—Jeffrey A. Smith
*Attorney, Agent, or Firm*—Baker, Maxham, Jester & Meador

[57] ABSTRACT

A child educational system comprises a support member having a generally flat rectangular support face having a top edge, a row of numbers disposed in a horizontal row along the top edge, a vertical column disposed below each of the numbers, each column having multiple pairs of position indicators therein, a permanent magnet disposed behind each of a plurality of the position indicators, and a plurality of magnetic responsive markers for positioning on the position indicators, whereby the markers are retained by the permanent magnets.

17 Claims, 3 Drawing Sheets

NUMBER AND MATH EDUCATION SYSTEM

BACKGROUND OF THE INVENTION

The present invention relates to education and training, and pertains particularly to an apparatus for enhancing the teaching of numbers and elementary math to children.

The education and/or teaching of a child can be accelerated with the aid of certain types of educational material. One particularly helpful type is interactive educational materials. Another helpful educational device or apparatus is one that is self-correcting. A self-correcting educational device is one that gives the student an indication when the answer is correct or incorrect. These are particularly effective in speeding the teaching of children and reduces the burden on the teacher. Such devices can also enable a teacher to teach a greater number of children at the same time. The present invention was devised primarily for giving teachers an improved tool for enhancing the development of children in the number and math skills at an early age.

It is desirable that an effective system be available for enabling teachers to quickly and effectively speed the development of children in the number and math skills at an early age.

SUMMARY OF THE INVENTION

It is the primary object of the invention to provide an improved system for enabling teachers to quickly and effectively speed the development of children in number and basic math skills at an early age.

In accordance with a primary aspect of the present invention, an improved educational system comprises a support member having a generally flat rectangular support face, and said face having a top edge, a bottom edge and opposed side edges, a row of numbers disposed in a horizontal row along said top edge, a vertical column disposed below each of said numbers, each column having multiple pairs of position indicators therein, a permanent magnet disposed behind each of a plurality of said position indicators, and a plurality of magnetic responsive markers for positioning on said position indicators, whereby said markers are retained by said permanent magnets.

BRIEF DESCRIPTION OF THE PREFERRED EMBODIMENTS

The above and other objects and advantages of the invention will become apparent from the following description when read in conjunction with the accompanying drawing wherein.

DETAILED DESCRIPTION OF THE PREFERRED EMBODIMENT

Figure 1:
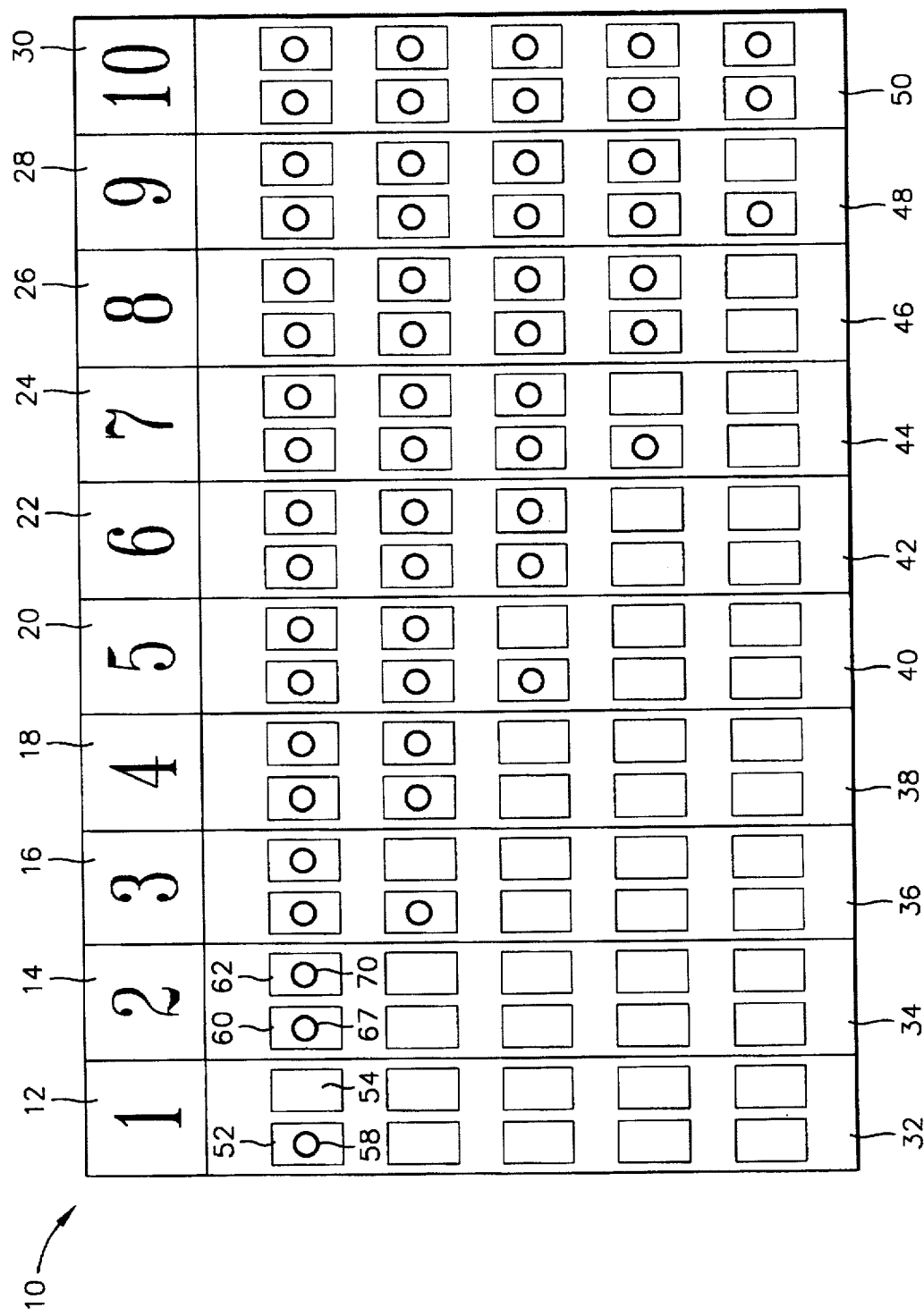
FIG. 1 is a front elevation view of an exemplary preferred embodiment of the invention.

Referring to FIG. 1 of the drawing, an exemplary preferred embodiment of the invention is illustrated and designated generally by the numeral 10. The invention comprises an educational apparatus or tool and comprises a generally rectangular, flat support panel which may be constructed of any suitable material such as cardboard or any other suitable, somewhat rigid material. The face of the panel is formed with a row of numbers which in the illustrated embodiment are the numbers 1 through 10 in a row at the top edge of the face panel. The illustrated row is in ascending sequence from left to right, but may be in the opposite order and, of course, may extend to any suitable number desired. The numbers can also be in any other desired selected order such as random numbers, odd numbers, or even numbers. They may also be selected to have any other desired characteristics such as those divisible only by a certain number such as 3, or the like.

The apparatus is designed to aid in the teaching of children to count, to recognize numbers, the values of numbers, addition and subtraction. In the illustrated embodiment, the top row on the face of the panel is formed into individual blocks or squares 12 through 30. Each square contains the respective number 1 through 10 in ascending sequence.

Figure 2:
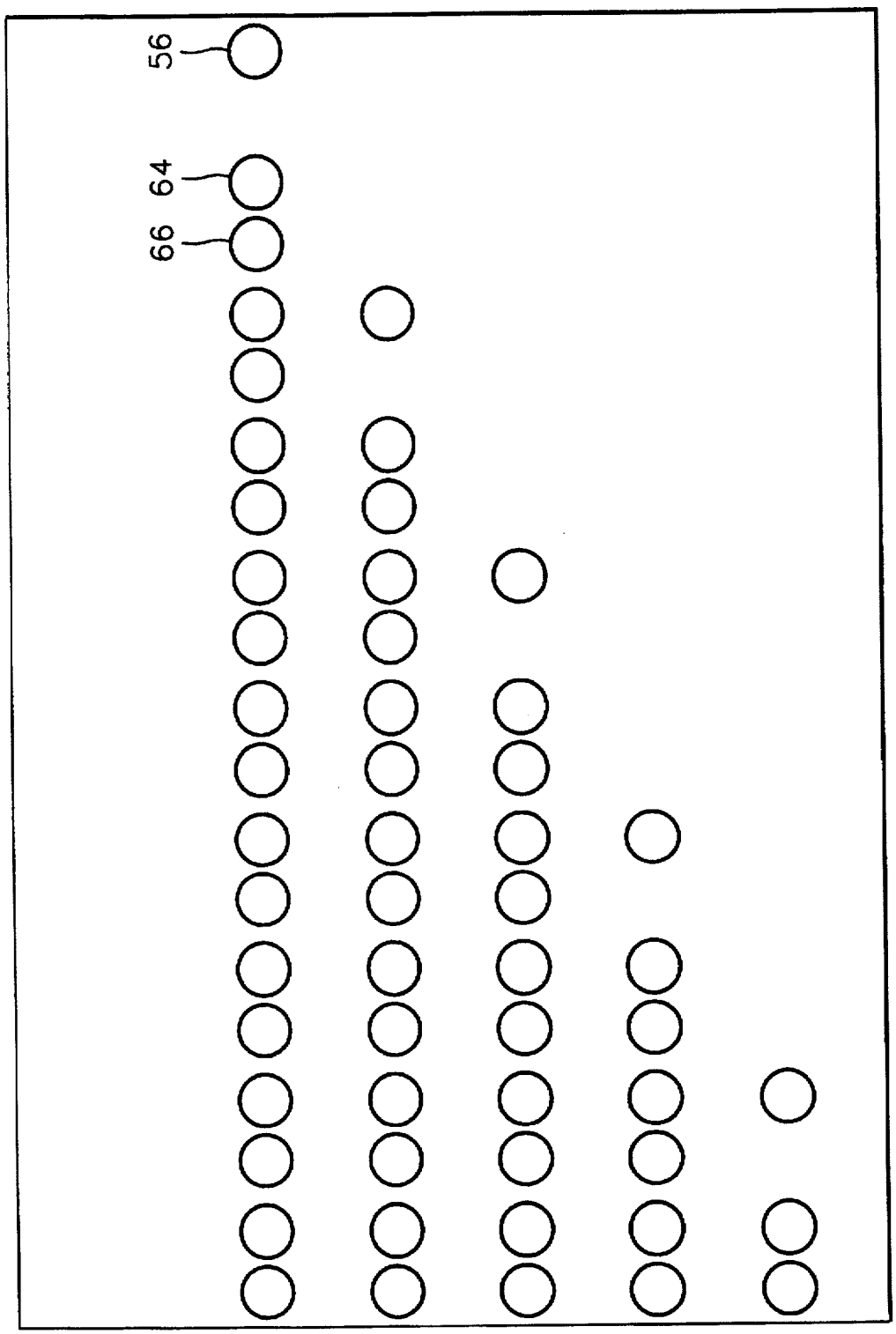
FIG. 2 is a rear elevation view of the embodiment of FIG. 1.

Disposed directly below each of the numbers in the above or top row are columns 32 through 50. Disposed in each of the columns are pairs of position indicators which are vertically disposed in side-by-side pairs in each vertical column. All columns contain the same number of position indicators which equal the highest number in the top row. Each column will be provided with an activated position indicator, or a number of activated position indicators equal to the number at the top of the column. For example, column 32 beneath the numeral 1 is provided with only one position indicator 52 that is activated. The position indicator can take on any form such as a square, rectangle, circle, dot or any other indicia means. The position indicator is activated by a permanent magnet 56 as illustrated in FIG. 2 mounted directly behind the position indicator 52. This magnet 56 may be attached directly to the back of the face panel by any suitable bonding or gluing means or method. It may also be attached by sandwiching between a laminate of two panels.

Each column under each number has pairs of position indicators disposed side-by-side as illustrated. Uneven numbers will have an odd or an unpaired activated position indicator. Thus, children can be easily taught odd and even numbers by quickly locating those indicators that are not paired for odd numbers, and that are paired in the bottom-most location for even numbers.

The kit includes a plurality of magnetically attractable markers or counters to be placed on the face of the panel in the locations where magnets are disposed. The kit contains a number of markers equal to the sum of the numbers in the row at the top of the panel. The panel is preferably mounted in a somewhat vertical position such that markers not positioned over a magnet will drop off the face of the panel. The panel can be tilted up to as much as about forty-five degrees from the vertical. Thus, each column will retain a marker on only those indicators whose sum corresponds to the numbers in that column.

As shown in FIG. 1, a marker 58 is mounted and retained on the position indicator 52. If a marker is placed on the position indicator 54, as soon as it is released, it will fall from the face of the panel. The column 34 is provided with two position indicators 60 and 62 which are activated by magnets 64 and 66. Thus, markers 68 and 70 are retained in place on the face of the panel when placed there. Additional markers will not be retained in this column. Each of the columns as illustrated contain the requisite number of permanent magnets positioned beneath the requisite number of position indicators to equal the number at the top of the column. A child can quickly learn the value of each number in the top row by the number of markers held in position in the column beneath the respective number.

Figure 3:
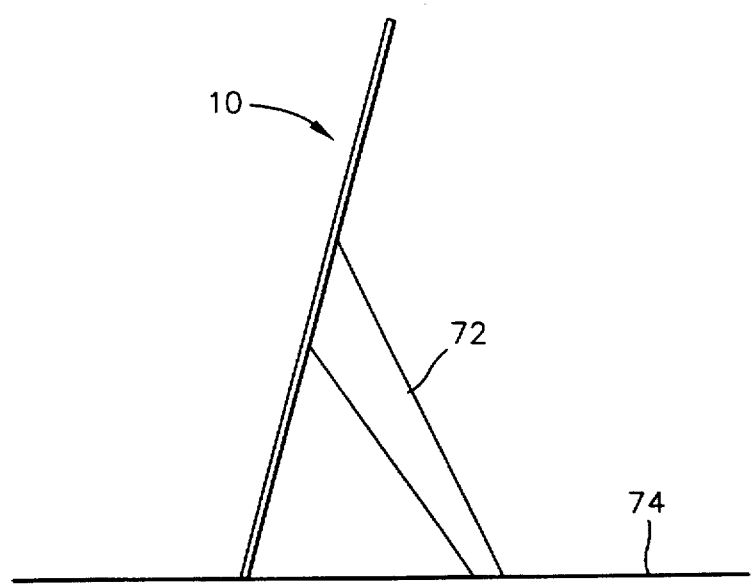
FIG. 3 is a side elevation view of the embodiment of FIG. 1 shown in the erected position.

The panel is preferably provided with suitable means to support it in a vertical position such as a foldout arm or panel 72 as illustrated in FIG. 3. As illustrated, a backing panel can have a cutout arm that folds outward for engagement with a desk or table surface 74 to hold the panel in a vertically inclined position. Other suitable means may also be used for this purpose. Additionally, the panel may be hung from a wall or other suitable means.

Figure 4:
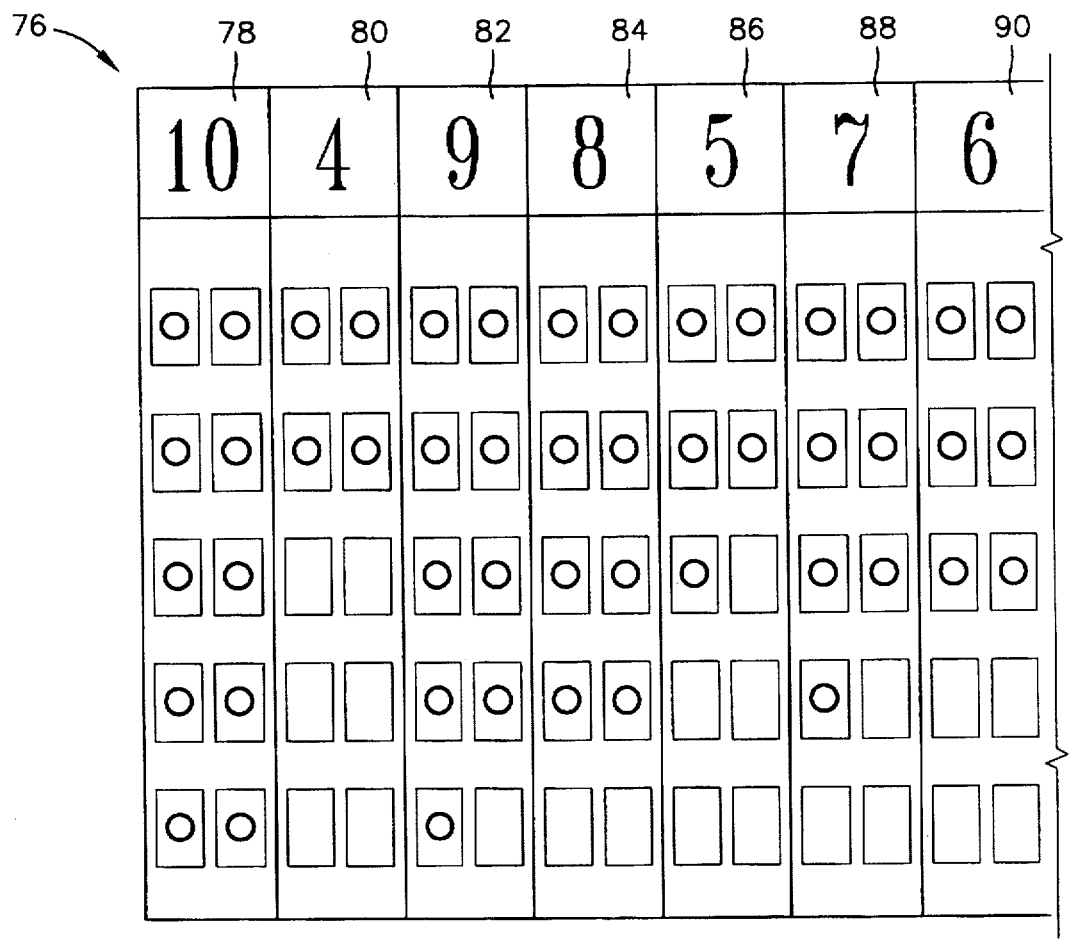
FIG. 4 is a front elevation view of an alternate embodiment.

Referring to FIG. 4, an alternate embodiment of a partial panel designated generally by the numeral 7 is illustrated wherein the panel is formed such that the numbers in the top row are random numbers in any desired arrangement or sequence. In the illustrated embodiment, the boxes in 78–90 are provided with the numeral sequence 10, 4, 9, 8, 5, 7, 6. The numbers may be a totally random sequence or random selection of numbers in a totally random sequence. Numerals can also be represented by any other symbol, character, written word, as expressed in any language or culture. Thus, the child can learn the value of a number when it is out of its normal sequence. Other selections of numbers may be made such as even numbers, odd numbers, or those having other common or similar characteristics. As in the prior embodiment, the number of position indicators should equal the value of the highest number in the top row. Also the markers should equal the sum of the numbers in the top row. Markers are preferably of the same color as numeral, characters, symbols or written words.

The system can also be adapted for a computer screen such that the screen depicts the desired panel layout. The child can place markers by means of a mouse or other tool. The program can be such that only those representing the number in the top row will stay in place in the respective column.

The number of markers in a kit equal the sum of the numbers at the top of the panel. Thus, if a child has markers left over when he has placed markers on the panel, he knows that he must go back and locate the column that is lacking a marker. The system is thus self-correcting. It becomes quickly obvious to the child when an error has been made so that he must go back and correct the error.

While I have illustrated and described my invention by means of specific embodiments, it is to be understood that numerous changes and modifications may be made therein without departing from the spirit and scope of the invention as defined in the appended claims.

I claim:

1. An educational system comprising:
  a support member having a generally flat rectangular support face, said face having a top edge, a bottom edge and opposed side edges;
  a row of numbers disposed in a horizontal row along said top edge;
  a vertical column disposed below each of said numbers, each column having multiple pairs of position indicators therein, the number of position indicators being at least equal to the number at the top of the respective column;
  a permanent magnet disposed behind a number of said position indicators equal to the number at the top of the respective column; and
  a plurality of magnetic responsive markers for positioning on said position indicators, whereby said markers are retained by said permanent magnets.

2. A system according to claim 1 wherein said markers equal in number of the sum of the numbers in said top row.

3. A system according to claim 2 wherein said magnets that are not paired are disposed on common side of said columns.

4. A system according to claim 3 wherein said magnets are disposed on a left side of said column.

5. A system according to claim 1 wherein said numbers in said top row are in ascending order.

6. A system according to claim 5 wherein said accedence in from left to right.

7. A system according to claim 1 wherein said numbers in said row are random numbers.

8. A system according to claim 7 wherein said markers equal in number to the sum of the numbers in said top row.

9. An educational kit comprising:
  a generally flat rectangular support member having a generally flat rectangular support face, said face having a top edge, a bottom edge and opposed side edges;
  a row of numbers disposed in a horizontal row along said top edge;
  a vertical column disposed below each of said numbers, each column having multiple position indicators therein at least equal in number to the number at the top of the column;
  a permanent magnet disposed behind a number of said position indicators equal in number to the number at the top of the column; and
  a plurality of magnetic responsive markers for positioning on said position indicators, whereby said markers are retained by said permanent magnets.

10. A system according to claim 9 wherein said position indicators are disposed in adjacent pairs in said columns, and said magnets that are not paired are disposed on a common side of said columns.

11. A system according to claim 10 wherein said magnets are disposed on a left side of said column.

12. A system according to claim 11 wherein said numbers in said top row are in ascending order from left to right.

13. A system according to claim 11 wherein said numbers in said row are random numbers.

14. An educational kit comprising:
  a generally flat rectangular support member having a generally flat rectangular support face, said face having a top edge, a bottom edge and opposed side edges;
  a row of numbers disposed in a horizontal row adjacent said top edge;
  a vertical column disposed below each of said numbers, each column having vertically disposed multiple side-by-side pairs of position indicators therein;
  a permanent magnet mounted behind a number of said position indicators in each column equal in number to the number at the top of each said column; and
  a plurality of magnetic responsive markers for positioning on said position indicators, said markers equal in number to the sum of the numbers in said row, said markers positionable on selected ones of position indicators, whereby said markers are retained by said permanent magnets.

15. A system according to claim 14 wherein said magnets that are not paired are disposed on a left side of said columns.

16. A system according to claim 14 wherein said numbers in said top row are in ascending order from left to right.

17. A system according to claim 14 wherein said numbers in said row are random numbers.

* * * * *